April 19, 1960

F. G. ROHR 2,933,191

BILGE WATER SEPARATOR

Filed June 12, 1958

INVENTOR.
Frank G. Rohr
BY
Charles C. Willson
ATTORNEY

United States Patent Office 2,933,191
Patented Apr. 19, 1960

2,933,191

BILGE WATER SEPARATOR

Frank G. Rohr, Barto, Pa., assignor to Fram Corporation, Providence, R.I., a corporation of Rhode Island Application June 12, 1958, Serial No. 741,664

1 Claim. (Cl. 210—309)

This invention relates to liquid separators for removing from water lighter immiscible liquids but was developed primarily to remove oil from bilge water.

The separator of the present invention is particularly well adapted for use on board ships to remove oil from bilge water before this water is pumped overboard, but may be used to remove gasoline and other fuels from water, and to treat the waste water from factories to remove chemicals that are lighter than water from such waste water.

In the past gravity separation has been largely relied upon to separate immiscible liquids such as above mentioned, but if the lighter liquid is thoroughly dispersed through the water gravity separation will be very slow. The present invention contemplates the use of coalescer means to cause the finely dispersed lighter liquid to coalesce into droplets that will separate quickly out of the water by gravity.

In accordance with the present invention an outer shell or container is provided which preferably extends in a horizontal direction and is divided by an upright partition into a first reservoir and second reservoir. The bilge water or other liquid to be treated is introduced into the first reservoir and after it is treated it is discharged from the second reservoir. A coalescer is provided in the first reservoir so that the water and coalesced liquid that pass through the coalescer are discharged through the partition into the second reservoir. Collecting chambers for the lighter liquid are provided in communication with the upper portion of the first and second reservoirs so that the lighter liquid, upon rising by gravity in these reservoirs, will collect in such chambers. The coarser droplets of the lighter liquid will rise quickly in the first reservoir, and the finer droplets upon passing through the coalescer will form larger droplets that will rise quickly in the second reservoir. In this manner a simple and efficient separator is provided to remove lighter dispersed liquids from water.

Figure 1:
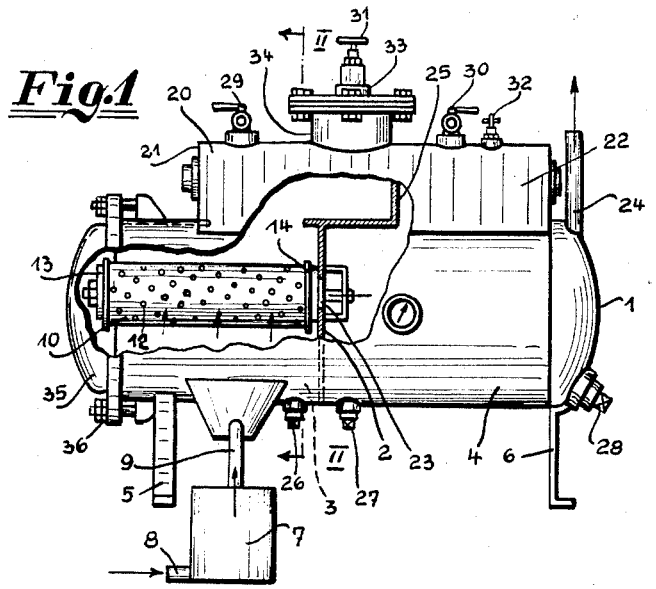
Figure 2:
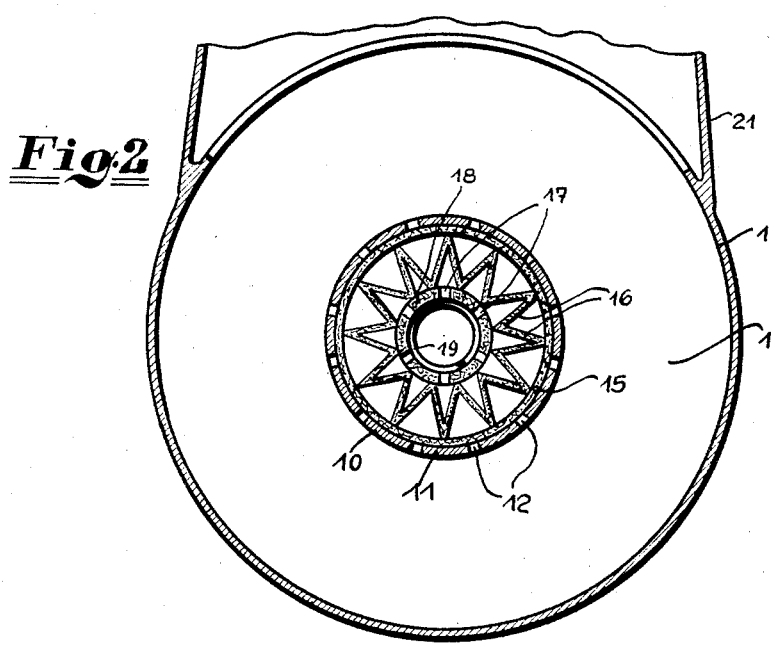

The above and other features of the invention will be further understood from the following description when read in connection with the accompanying drawing, wherein:

Fig. 1 is a side elevation of a liquid separator constructed in accordance with the present invention with portion of the outer shell broken away to show the inner structure of the separator, and Fig. 2, on a larger scale, is a vertical sectional view on the line II—II of Fig. 1.

Referring to the drawing, Fig. 1 shows a horizontally extending shell or tank 1 and within this shell, about midway between the ends thereof, there is provided a partition 2 which divides the shell into a first reservoir 3 and a second reservoir 4. The shell or tank is supported by the legs 5 and 6.

Before the water to be separated enters the shell 1, it, preferably, is passed through a pre-filter 7 which may contain therein screens or strainers. The purpose of this pre-filter is to remove the coarser solids from the bilge water or the like so as to prevent these from clogging the coalescer to be described. The bilge water is delivered from a pump, not shown, into the pre-filter 7 by means of a pipe 8, and the liquid passes from this pre-filter into the first reservoir of the shell 1 through a pipe 9.

Within the reservoir 3 of the shell is provided a cartridge 10 which serves as a filter and coalescer. This cartridge has an outer tube 11 which is provided with numerous openings or perforations 12, and the ends of this tube are sealed by the end closures 13 and 14. Inside the cartridge 10 is provided the glass fiber coalescing material 15 which is disposed against the inner face of the tube 11. This glass fiber material surrounds the pleated filter element 16 which is, preferably, formed of porous pleated paper, and the paper should be treated with a resinous material such as phenol formaldehyde to stiffen the paper and prevent it from becoming limp in the presence of water. This cartridge, which preferably is of the outside-in flow type, is removably secured to and supported by the partition 2, and the cartridge is connected to such partition by means 14 so that the liquid passing into the cartridge will be discharged from the interior thereof into the second reservoir 4 through an opening in the partition. The pleated paper filter element 16 surrounds an inner tube or screen 18 having the perforations 17, and in order to prevent this tube from sollapsing inwardly under the external pressure, a reinforcing spring 19 is preferably provided in the tube.

Above the shell 1 is provided an oil-receiving receptacle 20. This receptacle preferably is divided into a first chamber 21 and a second chamber 22 by means of an upright partition 25. The first chamber 21 is in communication with the upper portion of the reservoir 3, and the second chamber 22 is in communication with the upper portion of the reservoir 4. Since the coalescer cartridge 10 will offer some resistance to the flow of liquid therethrough, the pressure in the reservoir 3 will be somewhat higher than that in the reservoir 4. Also the pressure in the first chamber 21 will be higher than in the second chamber 22. For this reason it is important to provide the two chambers 21 and 22 rather than a single chamber. The present construction substantially reduces the work required of the coalescer, and since all of the water and finely dispersed lighter liquid therein that pass through the cartridge 10 will be filtered, the oil that rises in the reservoir 4 to collect in the chamber 22 will be cleaner than the oil that rises in the reservoir 3 and collects in the chamber 21. The liquids pass through the cartridge 10 in an outside-in direction and through an opening 23 in the partition 2 to enter the second reservoir.

The right-hand end of the shell 1, viewing Fig. 1, is provided with the discharge pipe 24, the inner end of which is connected to the shell at a level below that at which the oil normally accumulates upon the upper surface of the body of water in the shell.

The shell 1 is shown as having the drain means 26 for emptying the first reservoir and the drain means 27 for emptying the second reservoir. The second reservoir is shown as also having the clean-out opening 28. Oil that accumulates in the oil-receiving chamber 20 is removed therefrom through the oil-discharge valve 29, and the oil which accumulates in the chamber 22 is removed therefrom through the oil-discharge valve 30. The oil-receiving receptacles 20 and 22 are shown as having the air escape valves 31 and 32, respectively, and this chamber 20 is shown as having the dome 34 which may be provided with an automatic air escape valve 33. The left-hand end of the shell 1 is shown as having the removable cover 35 which is secured in sealing engagement with this end of the shell by the clamping bolts 36. The arrangement is such that the cover 35 may be removed when it is necessary to service or replace the filter cartridge 10.

The operation of the above described device may be briefly set forth as follows: The water to be treated preferably is passed through the pre-filter 7 so that the coarsest dirt will be removed therefrom before it enters the first reservoir 3 of the shell 1. This reservoir is preferably relatively large so that the liquid entering through the pipe 9 will circulate slowly in such reservoir so that the oil droplets of appreciable size in the water will rise by gravity to the upper portion of the container in which the liquid to be separated is confined, and such oil upon rising will find its way into the first oil chamber 20. The finer oil particles which rise more slowly in the water will be carried by the flow of such water towards the coalescer cartridge 10. Some of these finer oil particles will deposit upon the outside of the tube 11 and will gradually rise therefrom to the upper portion of the shell. Other fine oil particles will pass with the stream of water inwardly through the cartridge walls and through the partition 2 into the second reservoir 4. The water that is forced into the tank 1 will fill the reservoir 3 and then pass through the coalescer 10 into the reservoir 4. The coalescer will filter out the dirt and coalesce the fine oil particles into larger particles which will rise in the second reservoir to enter the oil-collecting chamber 22. The water thus freed from dirt and practically all of the oil therein will be discharged from the shell through the outlet 24. Under normal operating conditions most of the oil will be removed in the first reservoir 3 to reach the oil-receiving receptacle 20, and only a minor portion of the oil will be removed in the second receptacle 22.

Having thus described my invention, what I claim and desire to protect by Letters Patent is:

A bilge water separator for removing dispersed oil from a predominant quantity of water comprising a longitudinally extending shell divided approximately mid-way of its length by an upright partition into a first reservoir and a second reservoir, an inlet for delivering water containing dispersed oil into the first reservoir and an outlet for discharging the oil-free water from the second reservoir, an oil collecting chamber connected to the upper portion of the first reservoir and another oil-collecting chamber connected to the upper part of the second reservoir so that oil rising in the first reservoir will collect in the first chamber under one pressure and oil rising in the second reservoir will collect in the second chamber at a lower pressure, and a coalescer cartridge of the outside-in-flow type in the first reservoir below and outside of the first mentioned oil-collecting chamber and having its interior connected to the second reservoir by means of an opening through the partition, whereby a substantial portion of the oil is removed by the first reservoir and chamber to reduce the work required of the coalescer and the rest passes through the coalescer to rise into the second chamber.

References Cited in the file of this patent
UNITED STATES PATENTS

| | | |
|---|---|---|
| 2,468,382 | Taylor | Apr. 26, 1949 |
| 2,555,607 | Robinson | June 5, 1951 |
| 2,597,475 | Grise | May 20, 1952 |
| 2,626,709 | Krieble | Jan. 27, 1953 |
| 2,664,170 | Walker et al. | Dec. 29, 1953 |
| 2,706,531 | Lonelady et al. | Apr. 19, 1955 |
| 2,732,077 | Robinson | Jan. 24, 1956 |